United States Patent Office 2,749,206
Patented June 5, 1956

2,749,206

PROCESS FOR DYEING OR PRINTING CELLULOSE-CONTAINING MATERIALS AND COMPOSITIONS SUITABLE THEREFOR

Jacques Wegmann and Karl Menzi, Basel, Switzerland, assignors to Ciba Limited, Basel, Switzerland, a Swiss firm No Drawing. Application November 25, 1952,
Serial No. 322,548

Claims priority, application Switzerland December 7, 1951

13 Claims. (Cl. 8—42)

This invention provides a valuable process for dyeing or printing cellulose-containing materials, in which a neutral to alkaline dyebath or printing paste is used which contains a direct dyestuff in which a metal having an atomic number from 27 to 29 is bound in complex union to at least one ortho-hydroxy-ortho'-carboxy-azo-grouping, an aliphatic α-amino-carboxylic acid, and phosphorus-containing anions of a phosphoric acid of the constitution $$H_{m+2}P_mO_{3m+1}$$

in which $m$ represents a whole number greater than 1.

The dyebath may be prepared either directly in the concentration necessary for dyeing or advantageously by diluting a so-called stock solution which is of the above composition but contains the ingredients in a concentration too high for direct use. For printing pastes solutions having a high concentration of dyestuff are always necessary.

The dyestuffs used in the process of the invention are direct dyestuffs which contain a metal having an atomic number from 27 to 29, that is to say, cobalt or especially nickel or copper, and above all copper, bound in complex union to at least one ortho-hydroxy-ortho'-carboxy-azo-grouping. As direct dyestuffs there are to be understood only those which possess a sufficiently good solubility in water to enable them to be used in concentrations usual in dyebaths without the addition of agents enhancing solubility. This is the case when the solubility of the dyestuff is such that at least about 10 grams of the dyestuff dissolve in one liter of hot water.

The dyestuffs contain at least one of the above mentioned metals bound in complex union to an ortho-hydroxy-ortho'-carboxy-azo-grouping. Among these complex atomic groupings are those represented by the formulae

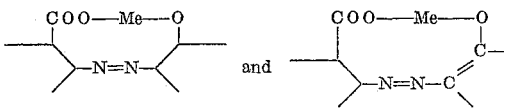

in which Me represents the metal atom bound in complex union, namely Co, Ni or Cu. The formulae undoubtedly give the correct stoichiometric quantity of metal and the correct position of the metal atom in the complex, but the distribution of main and secondary valencies in the complex union of the metal wtih the dyestuff has not up to now been established with certainty.

There come into consideration principally dyestuffs having two azo linkages. The azo linkages of a single dyestuff may be present wholly or partially in the form of metallized ortho-hydroxy-ortho'-carboxy-azo-groupings. Furthermore, the dyestuffs may also contain other groupings capable of forming metal complexes, for example, ortho:ortho'-dihydroxy-azo-groupings or salicyl groups, advantageously the former are also present in the form of heavy metal complexes and the latter not in the form of metal complexes.

It is also of advantage that any ionogenic acid groups in the dyestuffs, that is to say, especially sulfonic acid or carboxylic acid groups (insofar as the latter are not present in the form of ortho-hydroxy-ortho'-carboxy-azo-metal complexes), should be present in the form of alkali metal salts.

As aliphatic α-amino-carboxylic acids there are advantageously used the easily accessible acids of simple constitution such, for example, as α-amino-propionic acid (alanine), methylamino acetic acid (sarcosine), β-hydroxyethylaminoacetic acid and especially aminoacetic acid (glycocoll).

In addition to the dyestuff of the α-aminocarboxylic acid the dyebaths contain phosphorus-containing anions of a phosphoric acid of the constitution $$H_{m+2}P_mO_{3m+1}$$

in which $m$ represents a whole number greater than 1. There come into consideration, for example alkali salts of the polyphosphoric acids of the formulae $H_6P_4O_{13}$ and $H_5P_3O_{10}$, and especially those of pyrophosphoric acid ($H_4P_2O_7$).

With regard to the relative proportions of the above described ingredients which are present in the solutions or printing pastes or are used for making them, the following observations should be noted: Advantageously the proportion of the α-amino-carboxylic acid should amount to about one-tenth to one-half of the quantity of dyestuff as such, that is to say, excluding any substantial quantities of salts such as sodium sulfate or other diluents. In some cases larger quantities of the α-amino-carboxylic acids may have a disadvantageous effect. The quantity of phosphate ion advantageously amounts to one-fifth to double the quantity of the dyestuff. Good results are obtained in most cases with about equal quantities of dyestuff and a crystalline tetra-alkali-pyrophosphate, but in general larger quantities of phosphorus-containing anions have no disadvantageous effect.

The order of succession in which the necessary ingredients are added to the water for preparing the stock solutions and dyebaths is entirely optional and usually has no influence on the result. However, good results are frequently impaired if, in preparing solutions of high concentration, there are added in addition to the aforesaid substances appreciable amounts of other electrolytes, so that it is of advantage to avoid such additions. For this reason it is generally desirable to use the metalliferous dyestuffs, not in a form made up to a certain strength by means of sodium sulfate or sodium chloride, but in the form in which they are customarily isolated during their manufacture, and in which they do not contain disadvantageous quantities of those salts.

The disadvantageous effect of electrolytes consists mainly in impairing the process of dissolution which, although it is hardly noticeable in high dilutions, for example, at the concentrations ordinarily used in dyebaths, at high concentrations, such as are necessary in stock solutions, printing pastes and in some cases in machine dyeing, can lead to incomplete dissolution of the dyestuff.

The dyebaths and printing pastes used in the process of the invention must have a neutral or advantageously alkaline reaction. When the reaction is not already alkaline, for example, due to the presence of tetra-sodium pyrophosphate, an alkaline reaction can be produced by the addition of suitable substances of alkaline reaction, such as an alkali hydroxide, trisodium ortho-phosphate, ammonia or ethanolamine. However, for the reasons explained above it is in some cases disadvantageous to use for this purpose an alkali carbonate or bicarbonate.

Instead of preparing the dyebaths, stock solutions or printing pastes by dissolving the necessary ingredients separately and in succession in water, it is in general of advantage to make up the aforesaid ingredients in the form of dry preparations.

Valuable preparations are, for example, those which contain a direct dystuff of the kind hereinbefore defined and an aliphatic α-amino-carboxylic acid or an alkali phosphate as defined above. Such preparations can be used for preparing stock solutions, dyebaths and printing pastes, the lacking compound which contains the phosphorus-containing anions or the lacking α-aminocarboxylic acid being added to the solution.

However, it is usually of advantage to make up preparations which contain, in addition to the direct dyestuff, the aliphatic α-amino-carboxylic acid and also the phosphorus-containing anions, for example in the form of the anion of an alkali salt of the phosphoric acid in question.

When the preparations are to be made up to a predetermined strength it is of advantage to choose for this purpose, for example, a larger or smaller quantity of the alkali pyrophosphate or polyphosphate or to add a non-electrolyte such as urea or a water-soluble carbohydrate such as saccharose or dextrin. As stated above, the usual diluents such as sodium sulfate often have a disadvantageous effect. In the case of some of the aforesaid dyestuffs the disadvantageous effect of such additions consists in considerably reducing the favourable action of the α-aminocarboxylic acid of the phosphorus compound.

In other respects dyeing with the solutions used in the present invention is carried out in a manner in itself known for direct-dyeing dyestuffs. Similarly, printing pastes are advantageously made up in the usual manner with thickening agents known to be suitable for use with direct dyestuffs and are used in known manner.

In the case of those dyestuffs defined above which are sufficiently soluble for preparing stock solutions of the usual concentration and for dyeing from dilute baths, but have too little solubility for the preparation of stock solutions of higher concentration, such as are necessary for printing pastes and for machine dyeing, the present invention makes it possible to increase the solubility to such an extent that the dyestuffs can generally be used without difficulty for these latter purposes. Furthermore, in some cases it is possible in accordance with the present process to produce stronger and purer tints. In addition to this the α-aminocarboxylic acids together with the phosphates enable some dyestuffs to penetrate more rapidly and more deeply into the cellulose fiber, and this is of advantage in various connections, for example, in that it enables dyeings to be produced which are especially uniform or especially strong and yet have no bronzing effect, and this result can be obtained within a relatively short time. From this it will be understood that the process is especially useful for dyeing in a continuous manner, for example, in dyeing on the foulard. Finally, in some cases the control of the speed of absorption of the dyestuffs from the dyebaths by the fractional addition of salt is improved by the process of the invention as compared with the use of dyebaths not containing the additions characteristic of the invention.

In certain cases it is desirable to after-treat dyeings or prints produced by the present process with agents which enhance their properties of wet fastness. As products suitable for this purpose there may be mentioned: the reaction products of formaldehyde with compounds such as cyanamide, dicyandiamide, dicyandiamidine, or melamine. There also come into consideration after-treating agents which are not prepared with formaldehyde. After-treating agents combined with copper salts may be used more especially for dyeings or prints produced with dyestuffs which contain further free metallizable groups.

The following examples illustrate the invention, the parts and percentages being by weight.

*Example 1*

10 parts of the dyestuff of the formula

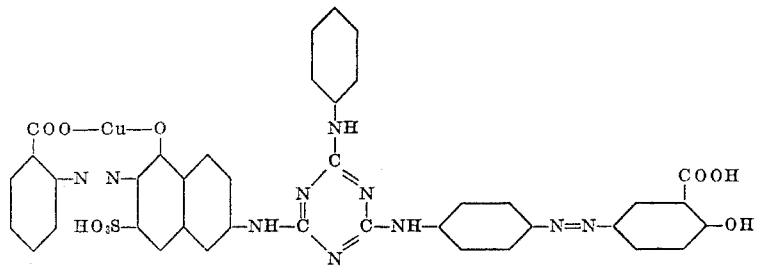

are mixed with 1 part of glycocoll and 9 parts of crystallized sodium pyrophosphate. The mixture is dissolved at the boil in 100 parts of water.

20 parts of the resulting stock solution are added to a dyebath of 2880 parts of water at 60° C. and 30 parts of crystalline sodium sulfate are added.

100 parts of cotton are entered into the bath and the temperature is raised to 90–95° C. in the course of ½ hour. The bath is maintained at that temperature for one hour, and after rinsing and drying there is obtained a yellowish brown dyeing, which is purer and stronger than a dyeing prepared with the same quantity of the dyestuff but without the addition of glycocoll and sodium pyrophosphate, and with a much greater quantity of water in order to dissolve the dyestuff.

In spite of the alkaline reaction of the bath, cellulose acetate silk effect threads remain pure white, whereas in a control bath, which is given the same pH value by the addition of sodium carbonate and contains neither glycocoll nor pyrophosphate, the cellulose acetate silk effect threads are stained.

Effect threads of wool are dyed the same tint, whereas in a control bath the dyestuff absorbed on to the wool is decomposed and the wool effect threads are colored a dirty grey.

If the above procedure is repeated, except that 120 parts of crystalline sodium sulfate are used instead of 30 parts, the bath is practically completely exhausted, and a dyeing is produced which is considerably more powerful than the control dyeing produced without glycocoll and pyrophosphate. Complete absorption of the dyestuff cannot be brought about without the latter additions, as the dyestuff begins to flocculate out when 60 or more parts of crystalline sodium sulfate are present in the dyebath, and the precipitated dyestuff is lost to the dyeing process. The difference in the purity of the tint is considerably greater in this case than in dyeing as described above with only 30 parts of sodium sulfate.

By increasing the quantities of the stock solution from 20 parts to 40 or 80 parts, and otherwise dyeing in the manner described above, a considerable increase in dyeing strength and purity over the control dyeing is also observed. The control dyeing cannot be improved by using a greater quantity of the salt addition, as at these higher dyestuff concentrations the tendency of the dyestuff to flocculate out is still more pronounced. With the product containing glycocoll and pyrophosphate, on the other hand, the stronger dyeing produced by the increased addition of electrolyte can be still further increased.

Example 2

10 parts of the concentrated dyestuff of the formula

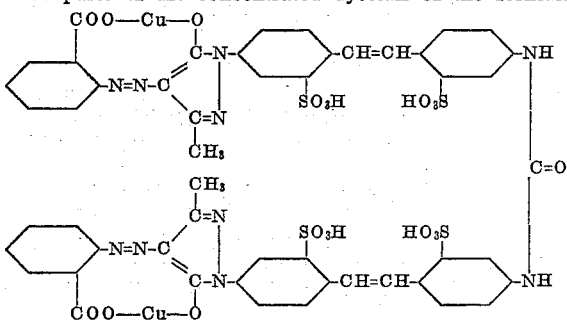

are mixed with 1.5 parts of glycocoll and 2 parts of crystalline sodium pyrophosphate. The mixture is soluble in 250 parts of boiling water, whereas without the glycocoll 1000 parts of water are necessary notwithstanding the presence of the pyrophosphate.

By dyeing in the manner described in Example 1 100 parts of cotton or viscose artificial silk with 3 parts of the mixture of dyestuff, glycocoll and sodium pyrophosphate, there is obtained a clear yellow tint of extraordinary fastness to light and good fastness to water.

By adding to the rinsing bath 1 gram per liter of a

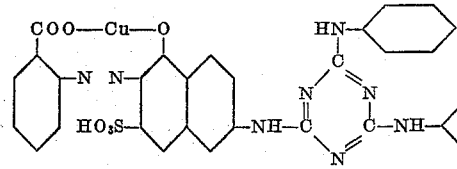

condensation product of formaldehyde and dicyandiamide the dyeing acquires a very good fastness to soap/sodium carbonate washing.

The dyeing has the same properties of fastness as a control dyeing produced without the addition of glycocoll and phosphate, but it excels the control dyeing with regard to purity of tint.

With this dyestuff it is easy to produce very strong yellow tints in dyeing machines with the use of a very short liquor ratio, which is not possible without the addition of glycocoll and pyrophosphate owing to the difficulty with regard to the solubility of the dyestuff being impaired. For example, 10 parts of the dyestuff mixed with glycocoll and sodium pyrophosphate (see above) may be dissolved in 400 parts of boiling water and the solution poured into 200 parts of water in a dyeing jigger. After the addition of 10 parts of crystalline sodium sulfate 200 parts of cotton are entered, the temperature is raised to the boil in the course of ½ hour, and dyeing is carried on for one hour at that temperature. There is obtained an extremely strong yellow tint having very good properties of fastness. The dyestuff itself, that is to say, without the addition of glycocoll and pyrophosphate, is unsuitable for this method of dyeing, because it requires 1000 parts of water to dissolve the dyestuff, and the dyestuff will not tolerate any addition of sodium sulfate without flocculating out.

By using instead of the copper complex, the nickel complex of the aforesaid dyestuff, the improvement is even more marked, and still purer yellow dyeings having remarkable properties of fastness are produced.

Example 3

10 parts of the dyestuff of the formula

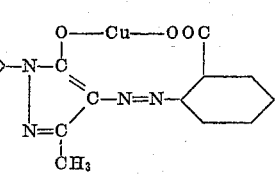

are mixed with 1 part of glycocoll and 9 parts of crystalline sodium pyrophosphate. The mixture is dissolved to a clear solution in 100 parts of water whereas 10 parts of the dyestuff mixed with 10 parts of crystalline sodium sulfate require 10 times the quantity of water.

The mixture with glycocoll and sodium pyrophosphate yields a pure yellowish brown tint, whereas with the same dyestuff mixed only with sodium sulfate a duller more reddish brown tint is produced.

Example 4

10 parts of the dyestuff of the formula

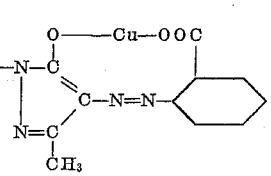

are mixed with 1 part of glycocoll and 9 parts of crystalline sodium pyrophosphate, and the mixture is dissolved in 200 parts of boiling water. The solution is diluted with water to give 800 parts and a fabric of staple fibers of regenerated cellulose is foularded with the resulting solution. The dyeing is then developed for 10 minutes in a boiling bath containing, per liter, 50 grams of sodium chloride. There is produced a strong reddish brown tint which is excellently through-dyed. This procedure which is especially favorable for through-dyeing naps can be used, without the addition of glycocoll and pyrophosphate, only to produce paler tints, as a corresponding quantity of the dyestuff made up with sodium sulfate requires 1000 parts of water to dissolve it at the boiling temperature. However, this temperature can hardly be maintained during foularding.

Example 5

10 parts of the dyestuff of the formula

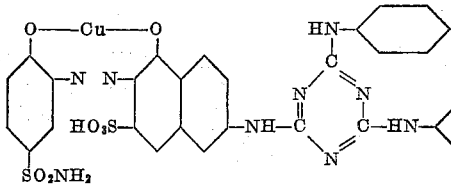

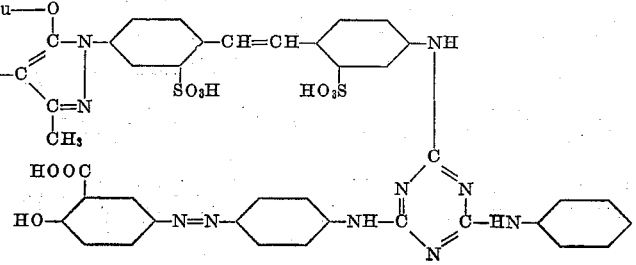

which contains but a little salt, are mixed with 1 part of sarcosine and 9 parts of crystalline sodium pyrophosphate and dissolved in 300 parts of boiling water. Without the addition of sarcosine 100 parts of water would be necessary. By replacing the sarcosine by the same quantity of alanine (α-aminopropionic acid) there is obtained a preparation of similar good solubility.

By dyeing vegetable fibers with this mixture in the manner described in Example 1, there are produced yellow dyeings having very good properties of fastness to light and water, and as compared with dyeings produced from the dyestuff mixed only with crystalline sodium sulfate they possess greater purity.

By after-treatment in the rinsing bath for 10 minutes with 2 grams per liter of a product consisting of 25 parts of copper acetate and 75 parts of a condensation product of 1 mol of dicyandiamide and 2.2 mols of formaldehyde, there is obtained a more greenish dyeing which is considerably improved with respect to its fastness to washing.

By using in the above mixture, instead of tetra-sodium pyrophosphate, the same quantity of hexasodium tetra-polyphosphate a similar good result is obtained.

*Example 6*

15 parts of the dyestuff mentioned in Example 3 are mixed with 2 parts of glycocoll, 13 parts of crystalline tetrasodium pyrophosphate and 150 parts of urea, and the mixture is dissolved in 395 parts of water at the boil. The resulting solution is poured while stirring into 500 parts of neutral tragacanth thickening, which contains 30 parts of dry substance, and 5 parts of sodium metanitrobenzene sulfonate are added.

A cotton fabric, a fabric of staple fibers of regenerated cellulose and a fabric of viscose artificial silk are printed with the resulting printing color.

The prints are dried and then steamed for 45 minutes. They are then thoroughly rinsed in cold water and dried. On all three fabrics there are obtained yellowish brown level prints of very good fastness to light and washing. By adding to the rinsing bath 3 grams per liter of a product, consisting of 20 parts of sodium copper tartrate and 80 parts of a condensation product of dicyandiamide and formaldehyde, and dissolved with one half its weight of ammonia solution, and carrying on the treatment for 10 minutes, the prints are also given a good fastness to washing.

*Example 7*

20 parts of the dyestuff mentioned in Example 2 are mixed with 4 parts of glycocoll and 8 parts of crystalline tetra-sodium pyrophosphate. 150 parts of urea are added, and the whole is dissolved in 295 parts of boiling water. The resulting solution is stirred into 500 parts of neutral tragacanth thickening (containing 30 parts of dry substance), and a further 20 parts of crystalline tetra-sodium pyrophosphate and 5 parts of sodium meta-nitrobenzene sulfonate are added.

A viscose fabric is printed, dried and steamed for 10 minutes, whereby a good level yelow print is obtained.

What we claim is:

1. Process for coloring textile materials containing cellulosic fibers with metalliferous direct dyestuffs, which comprises applying to said materials a neutral to alkaline aqueous dyestuff composition which contains a direct dyestuff in which a metal having an atomic number from 27 to 29 is bound in complex union to at least one ortho-hydroxy-orhto'-carboxy-azo-grouping, a water-soluble aliphatic α-amino-carboxylic acid, and an alkali metal salt of a phosphoric acid of the constitution $$H_{m+2}P_mO_{3m+1}$$

in which $m$ represents a whole number greater than 1.

2. Process for coloring textile materials containing cellulosic fibers with metalliferous direct dyestuffs, which comprises applying to said materials a neutral to alkaline aqueous dyestuff composition which contains a direct dyestuff in which a metal having an atomic number from 27 to 29 is bound in complex union to at least one ortho-hydroxy-ortho'-carboxy-azo-grouping, a water-soluble aliphatic α-amino carboxylic acid, and an alkali metal pyrophosphate.

3. Process for coloring textile materials containing cellulosic fibers with metalliferous direct dyestuffs, which comprises applying to said materials a neutral to alkaline aqueous dyestuff composition which contains a direct dyestuff in which a metal having an atomic number from 27 to 29 is bound in complex union to at least one ortho-hydroxy-ortho'-carboxy-azo-grouping, aminoacetic acid, and an alkali metal pyrophosphate.

4. Process for coloring textile materials containing cellulosic fibers with metalliferous direct dyestuffs, which comprises applying to said materials a neutral to alkaline aqueous dyestuff composition which contains a direct dyestuff in which copper is bound in complex union to at least one ortho-hydroxy-ortho'-carboxy-azo-grouping, aminoacetic acid, and an alkali metal pyrophosphate.

5. Process for coloring textile materials containing cellulosic fibers with metalliferous direct dyestuffs, which comprises applying to said materials a neutral to alkaline aqueous dyestuff composition which contains a direct dyestuff in which a metal having an atomic number from 27 to 29 is bound in complex union to at least one ortho-hydroxy-ortho'-carboxy-azo-grouping, aminoacetic acid, and sodium pyrophosphate.

6. Process for coloring textile materials containing cellulosic fibers with metalliferous direct dyestuffs, which comprises applying to said materials a neutral to alkaline aqueous dyesutff composition which contains the dyestuff of the formula

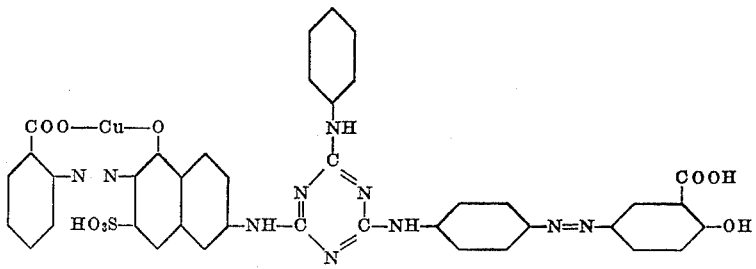

aminoacetic acid, and sodium pyrophosphate.

7. Process for coloring textile materials containing cellulosic fibers with metalliferous direct dyestuffs, which comprises applying to said materials a neutral to alkaline aqueous dyestuff composition which contains the dyestuff of the formula

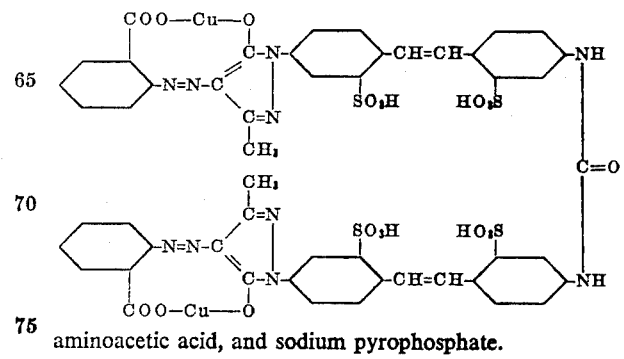

aminoacetic acid, and sodium pyrophosphate.

8. Process for coloring textile materials containing cellulosic fibers with metalliferous direct dyestuffs, which comprises applying to said materials a neutral to alkaline aqueous dyestuff composition which contains the dyestuff of the formula

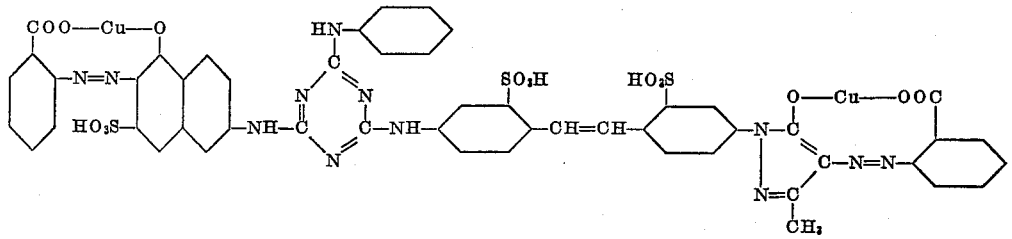

aminoacetic acid, and sodium pyrophosphate.

9. Process for coloring textile materials containing cellulosic fibers with metalliferous direct dyestuffs, which comprises applying to said materials a neutral to alkaline aqueous dyestuff composition which contains the dyestuff of the formula

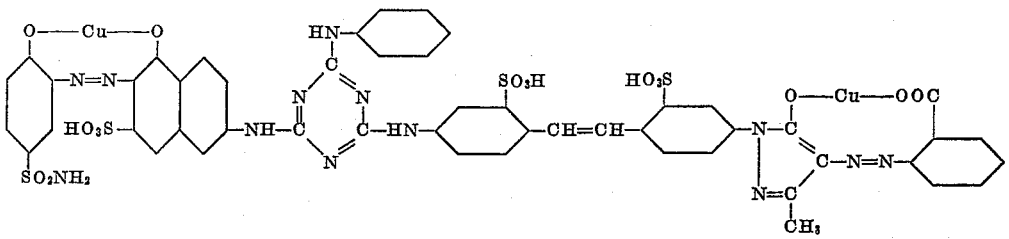

aminoacetic acid, and sodium pyrophosphate.

10. Process for coloring textile materials containing cellulosic fibers with metalliferous direct dyestuffs, which comprises applying to said materials a neutral to alkaline aqueous dyestuff composition which contains the dyestuff of the formula

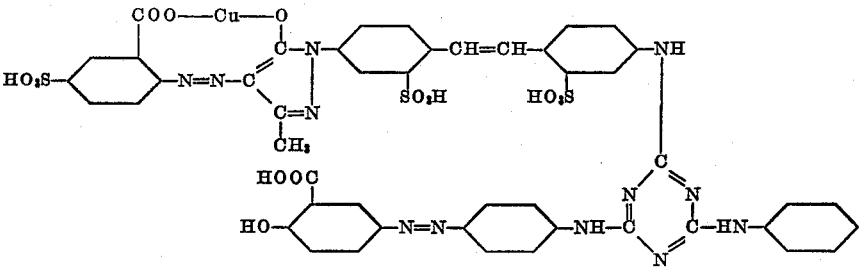

aminoacetic acid, and sodium pyrophosphate.

11. A neutral to alkaline aqueous dyestuff composition suitable for being applied on textile materials containing cellulosic fibers, which contains a direct dyestuff in which a metal having an atomic number from 27 to 29 is bound in complex union to at least one ortho-hydroxy-ortho'-carboxy-azo-grouping, an aliphatic α-amino-carboxylic acid, and an alkali metal salt of a phosphoric acid of the constitution $$H_{m+2}P_mO_{3m+1}$$

in which $m$ represents a whole number greater than 1.

12. A dyestuff preparation suitable for being applied on textile materials containing cellulosic fibers, which contains a direct dyestuff in which a metal having an atomic number from 27 to 29 is bound in complex union to at least one ortho-hydroxy-ortho'-carboxy-azo-grouping, an

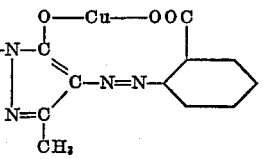

aliphatic α-amino-carboxylic acid, and an alkali metal salt of a phosphoric acid of the constitution $$H_{m+2}P_mO_{3m+1}$$

in which $m$ represents a whole number greater than 1.

13. A dyestuff preparation suitable for being applied on textile materials containing cellulosic fibers, which contains a direct dyestuff in which copper is bound in complex union to at least one ortho-hydroxy-ortho'-carboxy-azo-grouping, aminoacetic acid, and sodium pyrophosphate.

References Cited in the file of this patent

FOREIGN PATENTS 763,510    France    Feb. 12, 1934

OTHER REFERENCES

Chemical Technology of Dyeing and Printing by L. Diserens, translated by Wengraf and Baumann, New York city, 1948, Reinhold Publishing Corp., pgs. 8 to 19.

Journal Soc. Dyers and Colorists for June 1949, pg. 313.